United States Patent
Wey et al.

(10) Patent No.: US 6,895,146 B1
(45) Date of Patent: May 17, 2005

(54) MODE SCRAMBLER

(75) Inventors: Jun Shan Wey, Sammamish, WA (US); Mark Lewis Plett, Redmond, WA (US); Steven Andrew Cashion, Redmond, WA (US); Gerald Nykolak, Long Beach, NY (US); Robert Michael Pierce, Woodinville, WA (US)

(73) Assignee: Terabeam Corporation, Redmond, WA (US)

( * ) Notice: Subject to any disclaimer, the term of this patent is extended or adjusted under 35 U.S.C. 154(b) by 173 days.

(21) Appl. No.: 09/876,535

(22) Filed: Jun. 6, 2001

(51) Int. Cl.[7] .................................................. H01R 6/42
(52) U.S. Cl. ........................................................ 385/39
(58) Field of Search ............................ 385/39, 128, 16, 385/18, 24, 12, 37–38, 35.5, 28–29, 31, 124, 10, 11

(56) References Cited

U.S. PATENT DOCUMENTS 5,892,866 A * 4/1999 Bristrow et al. .............. 385/28
6,363,180 B1 * 3/2002 Yamate et al. ................ 385/12
6,415,082 B1 * 7/2002 Wach .......................... 385/39
6,510,265 B1 * 1/2003 Giaretta et al. ............... 385/38

FOREIGN PATENT DOCUMENTS

JP          61-233760      * 10/1986    ................. 385/39

* cited by examiner

*Primary Examiner*—J. F. Duverne
(74) *Attorney, Agent, or Firm*—Blakely Sokoloff Taylor & Zafman LLP

(57) ABSTRACT

A mode scrambler comprises an optical fiber adapter having a diffuser disposed between optical fiber mating ends of the optical fiber adapter. When a single mode optical signal is launched in the mode scrambler, the mode scrambler converts the single mode optical signal to a multimode optical signal that has a substantially even intensity distribution across the modes.

16 Claims, 3 Drawing Sheets

MODE SCRAMBLER

BACKGROUND OF THE INVENTION

1. Field of the Invention

The invention is directed to optical communication and, in particular, to an optical fiber mode scrambler.

2. Background Information

The maximum number of modes any optical fiber can propagate depends on the geometry/composition of the optical fiber and the wavelength of the optical source. The actual number of modes that do propagate depends on, among other things, the launch conditions from the optical source to the optical fiber.

There are two types of mode-distributions that have practical applications when working with multimode optical fiber. The first type of mode-distribution is "restricted launch", where only a small sub-set of propagating modes is coupled. Restricted launch has the advantage of resulting in reduced differential mode delay and, hence, less optical fiber dispersion. The second type of mode distribution is called an "overfilled launch," where optical power is coupled into as many possible propagating modes as is feasible.

There are advantages of an overfilled launch condition, whose product is referred to as a mode scrambler. For example, an overfilled launch condition may be used to characterizing multimode optical fiber components.

There are various techniques and devices for generating an overfilled launch condition in a multimode optical fiber. For example, one technique is to inject a single mode optical signal into several kilometers of multimode optical fiber. Micro-bending induced mode coupling along the optical fiber length eventually results in an optical signal that has stable equilibrium of optical power distributed among many modes (multimode optical signal). However, several kilometers of optical fiber are required for this mode transformation (from a single mode optical signal to a multimode optical signal). As a result, this approach is not practical, especially in a laboratory environment, which is where most testing occurs. Moreover, using several kilometers of optical fiber merely to test a multimode device is expensive and bulky.

Another technique for generating an overfilled launch condition in a multimode optical fiber when initially launching from a single mode optical fiber is to concatenate a short segment of graded index multimode optical fiber followed by a step index multimode optical fiber followed by another short segment of graded index optical fiber. The step index optical fiber effectively provides a launch condition that fills up the mode volume of the second graded index optical fiber, thus providing the desired overfilled launch condition.

Mechanical mode scramblers also have long been used to generate a multimode optical signal. A single mode optical signal is launched from a single mode optical fiber into a multimode optical fiber. The multimode optical fiber is placed in the mode scrambler, which has corrugated surfaces to provide micro-bends in the optical fiber and redistribute energy into all the modes in the multimode optical fiber, resulting in the desired overfilled launch condition. The mechanical mode scrambler physically bends the optical fiber such that the angle of reflection between the optical signal and the core/cladding interface will be altered as the single mode optical signal passes through the portion of the optical fiber being bent. In this way, the single mode launch optical signal will be coupled into many more modes to approximate an overfilled power distribution in the multimode optical fiber. One such mechanical mode scrambler is the FM-1 Mode Scrambler available from Newport Corporation in Irvine, Calif.

Despite the advantages, this type of mechanical mode scrambler imposes intolerable strain on the optical fiber when physically bending the optical fiber to alter the angle of reflection. Bending stretches one side of the optical fiber and compresses the other. Because most optical fibers are comprised of glass or plastic, any strain on the optical fibers increases the risk that they will break. Tight bends in optical fiber can cause cracks, which can affect the optical signal traveling through the optical fiber, and will eventually lead to breakage of the optical fiber. A broken or cracked optical fiber will not properly transmit an optical signal.

Additionally, to effectively approximate an overfilled power distribution in the optical fiber, the mode scrambler bends the optical fiber many times in alternating directions. This makes the mode scrambler difficult to use, and because the tests are not repeatable, the device cannot be properly characterized. The mode scrambler also must be physically large enough to accommodate multiple bends.

BRIEF DESCRIPTION OF THE FIGURES

In the drawings, like reference numbers generally indicate identical, functionally similar, and/or structurally equivalent elements. The drawing in which an element first appears is indicated by the leftmost digit(s) in the reference number, in which.

DETAILED DESCRIPTION

The present invention is directed to a mode scrambler. In the following description, numerous specific details are provided, such as particular processes, programming, components, etc., to provide a thorough understanding of embodiments of the invention. One skilled in the relevant art will recognize, however, that the invention can be practiced without one or more of the specific details, or with other methods, components, etc. In other instances, well-known structures or operations are not shown or described in detail to avoid obscuring aspects of various embodiments of the invention.

Some parts of the description will be presented using terms such as optical fiber, multimode, single mode, optical signal, and so forth. These terms are commonly employed by those skilled in the art to convey the substance of their work to others skilled in the art.

Reference throughout this specification to "one embodiment" or "an embodiment" means that a particular feature, structure, process, step, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Various operations will be described as multiple discrete steps, performed in turn, in a manner that is most helpful in understanding the invention. However, the order in which they are described should not be construed to imply that these operations are necessarily order dependent or that the operations be performed in the order in which the steps are presented.

Figure 1:
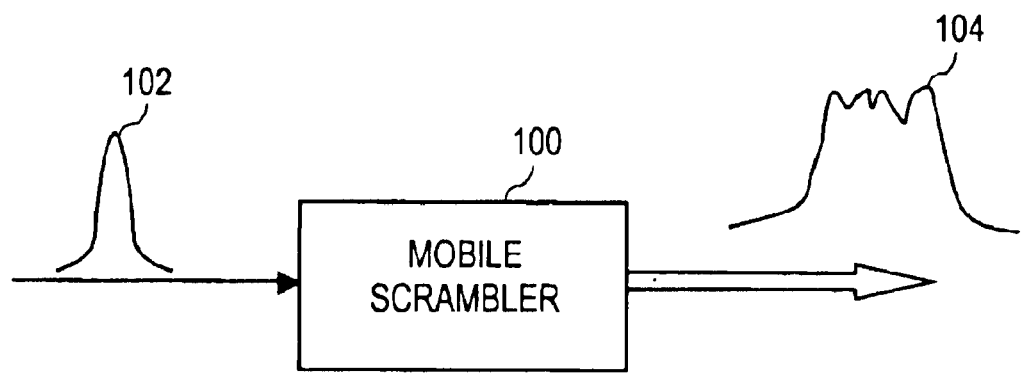
FIG. 1 illustrates a mode scrambler according to an embodiment of the present invention.

According to aspects of the present invention, a single mode optical signal is applied to the input of the mode scrambler. FIG. 1 illustrates an embodiment of the present invention, in which a single mode optical signal 102 is applied to an example mode scrambler 100, which converts the single mode optical signal 102 to a multimode optical signal 104. The single mode optical signal typically has a diameter of nine micrometers and a single Gaussian intensity distribution. The resulting multimode optical signal 104 has a diameter of fifty or 62.5 micrometers and a substantially uniform intensity distribution across modes. The mode scrambler 100 thereby simulates the effect of a single spatial mode optical beam having traveled through several kilometers of multimode optical fiber.

Figure 2:
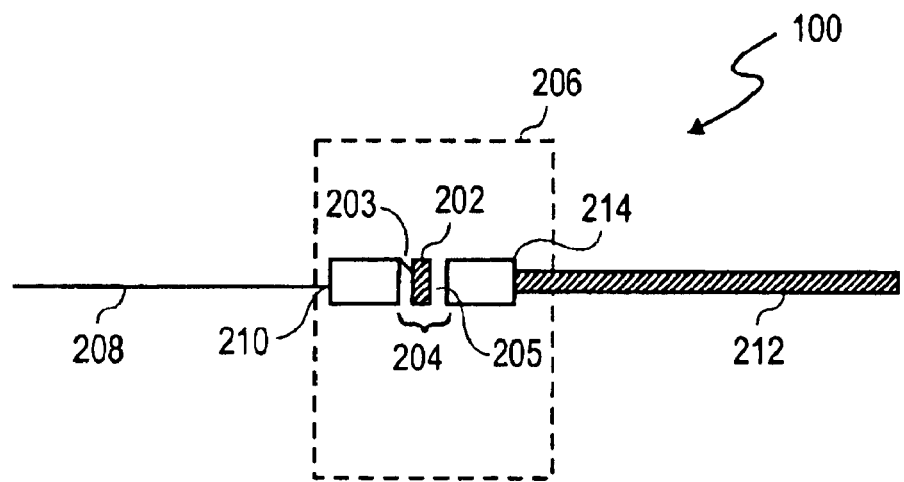
FIG. 2 is a schematic diagram of a mode scrambler according to an embodiment of the present invention.

FIG. 2 is a schematic diagram of one embodiment of the example mode scrambler 100, which includes a diffuser 202 disposed in a gap 204 of an optical fiber adaptor 206. A single mode optical fiber 208 is connected to one end 210 of the adaptor 206 and a multimode optical fiber 212 is connected to the other end 214 of the adaptor 206.

In one embodiment, the diffuser 202 may be a thin-film diffuser, such as a piece of Scotch® tape, a thin piece of glass, a thin piece of plastic, a thin piece of acetate, a thin piece of acrylic, or the like.

In one embodiment, the gap 204 may be filled with air. In this embodiment, when a single mode optical signal is launched into the mode scrambler 200, the diameter of the single mode optical signal expands after traveling through gap 204. The diffuser 202 diffuses the optical signal to generate a multimode optical signal whose modal energy distribution is sufficiently homogenized.

With the diffuser 202 in place, the gap 204 is separated into a gap 203 and a gap 205. In one embodiment, the gap 203 is filled with air. In this embodiment, the gap 203 allows a launched single mode optical signal to expand before encountering the diffuser 202. When the gap 204 is filled with air, the gap 205 allows the multimode optical signal to expand further prior to being launched in the multimode optical fiber 212.

The adaptor 206 can be any commercially available adapter that physically connects two optical fibers, such as well-known FC connectors, SC connectors, LC connectors, ST connectors, SMA connectors, and the like. For example, the adaptor 206 may be a fiber optic mating adapter F-MA-FC-FC, F-MA-SC-SC, F-MA-SC-FC, and the like, all available from Newport Corporation in Irvine, Calif.

Figure 3:
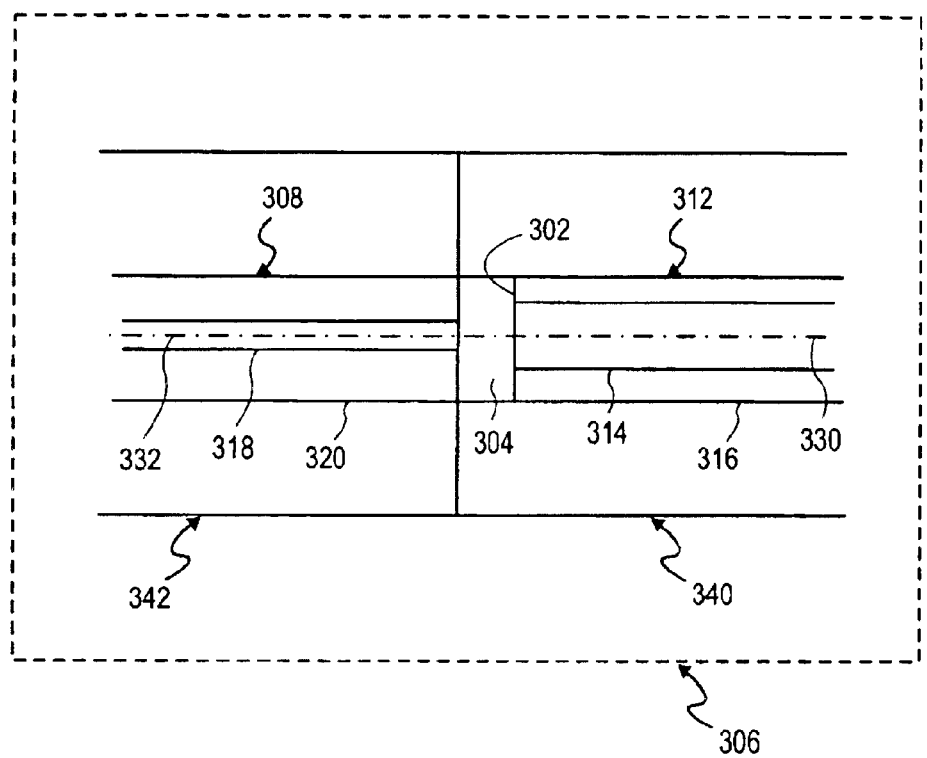
FIG. 3 is a high-level block diagram of a mode scrambler according to aspects of the present invention.

FIG. 3 is a schematic diagram of an example mode scrambler 300 according to an embodiment of the present invention. The mode scrambler 300 includes a gap 304, an adapter 306, a single mode optical fiber 308 in a ceramic ferrule housing 342, and a multimode optical fiber 312 in a ceramic ferrule housing 340. The multimode optical fiber 312 has a core 314 and cladding 316. The single mode optical fiber 308 includes core 318 and a cladding 320. The single mode optical fiber 308 in the ferrule 342 is connected to one end of the adaptor 306 and the multimode optical fiber 312 in the ferrule 340 is connected to the other end of the adaptor 306. A dotted line 330 and a dotted line 332 represent the centerlines of the core 314 and the core 318, respectively.

In one embodiment, a single mode optical signal is launched into the mode scrambler 300 and the gap 304 is filled with air. In this embodiment, the gap 304 allows the single mode optical signal to expand before encountering the core 314 of the multimode optical fiber 312.

According to an embodiment, the gap 304 is etched into the multimode optical fiber 312. A resulting roughened surface 302 serves as an equivalent diffuser. For example, the gap 304 may be formed using an etching compound, such as hydrofluoric acid (HF), e.g., screen etch, to remove the multimode optical fiber 312, which leaves the ceramic ferrule 340 to mate with the ceramic ferrule 342 that houses the single mode optical fiber 308. The ceramic ferrule 340 is dipped in the etching compound to remove the optical fiber 312. According to an alternative embodiment, the gap 304 is formed by pulling the optical fiber 312 away from the mating end of the ceramic ferrule 340, which leaves ferrule 340 to mate with the ferrule 342 on the single mode optical fiber side.

Figure 4:
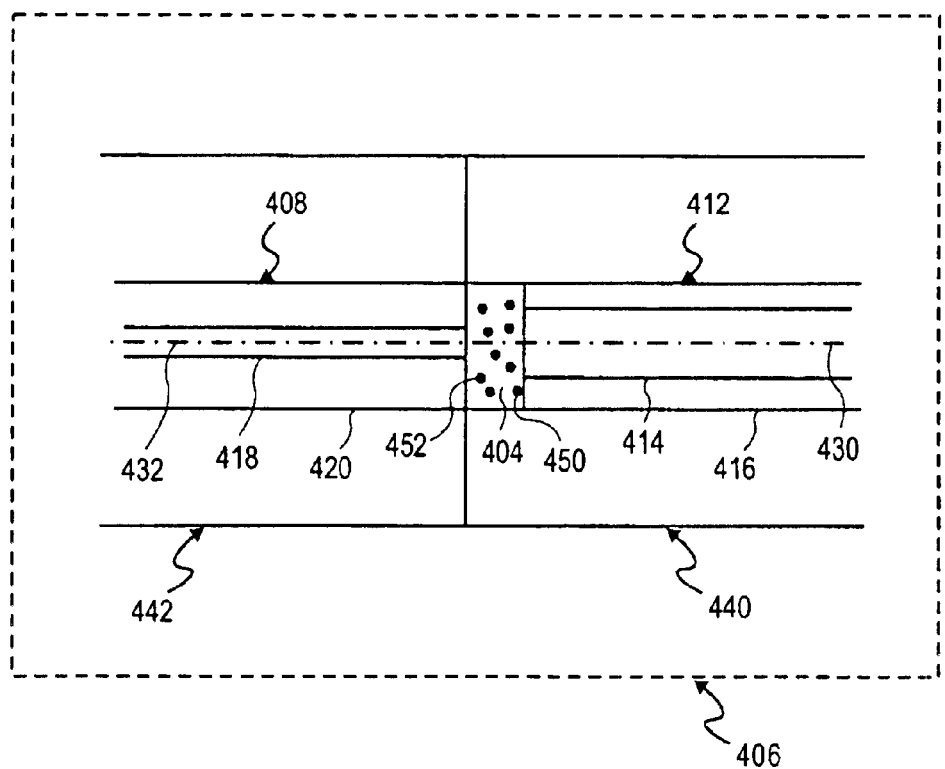
FIG. 4 is a schematic diagram of a mode scrambler according to an embodiment of the present invention.

FIG. 4 is a schematic diagram of an example mode scrambler 400 according to an embodiment of the present invention. The mode scrambler 400 includes a diffuser 404, an adapter 406, a single mode optical fiber 408 in a ceramic ferrule housing 442, and a multimode optical fiber 412 in a ceramic ferrule housing 440. The multimode optical fiber 412 has a core 414 and cladding 416. The single mode optical fiber 408 includes core 418 and a cladding 420. The single mode optical fiber 408 in the ferrule 442 is connected to one end of the adaptor 406 and the multimode optical fiber 412 in the ferrule 440 is connected to the other end of the adaptor 406. A dotted line 430 and a dotted line 432 represent the centerlines of the core 414 and the core 418, respectively.

The diffuser 404 is made of suitable particulate material, such as particulate 450 and 452, suspended in a material having uniform index of refraction, such as epoxy, ultraviolet (UV) glue, or index matching gel. When a single mode optical signal is launched into the mode scrambler 400, the diffuser 404 diffuses the single mode optical signal to generate a multimode optical signal.

The above description of illustrated embodiments of the invention is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description.

The terms used in the following claims should not be construed to limit the invention to the specific embodiments disclosed in the specification and the claims. Rather, the scope of the invention is to be determined entirely by the following claims, which are construed in accordance with established doctrines of claim interpretation.

What is claimed is:

1. A mode scrambler, comprising:
   an optical fiber adapter having a gap, a first end, and a second end, wherein a single mode optical fiber is coupled to the first end and a multimode optical fiber is coupled to the second end and wherein the single mode optical fiber and the multimode optical fiber are fixed relative to each other and the single mode optical fiber is substantially aligned with the multimode optical fiber; and
   a diffuser disposed in the gap.

2. The mode scrambler of claim 1 wherein the diffuser comprises a piece of Scotch® tape.

3. The mode scrambler of claim 1 wherein the diffuser comprises a thin piece of glass.

4. The mode scrambler of claim 1 wherein the diffuser comprises a thin piece of plastic.

5. The mode scrambler of claim 1 wherein the diffuser comprises a thin piece of acetate.

6. The mode scrambler of claim 1 wherein the diffuser comprises a thin piece of acrylic.

7. The mode scrambler of claim 1 wherein the diffuser comprises particulate suspended in a material having a uniform index of refraction.

8. The mode scrambler of claim 1 wherein the diffuser comprises air.

9. A method to scramble an optical signal, comprising:

substantially aligning a single mode optical fiber and a multimode optical fiber using an optical fiber adapter having a single mode end and a multimode end;

fixing the single mode optical fiber and the multimode optical fiber in their substantially aligned positions;

disposing a diffuser between the single mode end and the multimode end of the optical fiber adapter;

launching a single mode signal in the single mode end; and receiving a multimode optical signal in the multimode end.

10. The method of claim 9, further comprising disposing a piece of Scotch® tape between the mating ends of the optical fiber adapter.

11. The method of claim 9, further comprising disposing a thin piece of glass between mating ends of the optical fiber adapter.

12. The method of claim 9, further comprising disposing a thin piece of plastic between mating ends of the optical fiber adapter.

13. The method of claim 9, further comprising disposing a thin piece of acetate between mating ends of the optical fiber adapter.

14. The method of claim 9, further comprising disposing a thin piece of acrylic between mating ends of the optical fiber adapter.

15. The method of claim 9, further comprising disposing particulate suspended in a material having a uniform index of refraction between mating ends of the optical fiber adapter.

16. The method of claim 9, further comprising disposing air in the gap.

* * * * *